United States Patent [19]

Chen

[11] Patent Number: 5,499,169

[45] Date of Patent: Mar. 12, 1996

[54] REARVIEW MIRROR LAMP CIRCUIT ASSEMBLY

[76] Inventor: Chun-Ming Chen, 1/F., No. 549, Min-Sheng Rd., Sheng-Ping Li, West Dist., Taichung City, Taiwan

[21] Appl. No.: 442,342

[22] Filed: May 16, 1995

[51] Int. Cl.⁶ ..................................................... B60Q 1/26
[52] U.S. Cl. ............................................................. 362/83.1
[58] Field of Search ............................................. 362/83.1

[56]  References Cited

U.S. PATENT DOCUMENTS

| | | | |
|---|---|---|---|
| 2,693,589 | 11/1954 | Hopkins | 362/83.1 |
| 5,016,996 | 5/1991 | Ueno | 362/83.1 |
| 5,303,130 | 4/1994 | Wei et al. | 362/83.1 |
| 5,371,659 | 12/1994 | Pastrick et al. | 362/83.1 |

Primary Examiner—Carroll B. Dority
Attorney, Agent, or Firm—Morton J. Rosenberg; David I. Klein

[57] ABSTRACT

A rearview mirror lamp circuit assembly including a motor vehicle rearview mirror, a front lamp mounted on the back side of the case of the rearview mirror, a side lamp mounted on the outer lateral side of the case of the rearview mirror, and a control circuit connected to the electric circuit of the motor vehicle for controlling the operation of the front lamp and the side lamp, permitting the front lamp to be synchronously turned on with the headlamps of the motor vehicle, permitting the side lamp to be intermittently turned on and off with the corresponding directional signals of the motor vehicle, or permitting the side lamp to be constantly turned on without flashing.

3 Claims, 4 Drawing Sheets

REARVIEW MIRROR LAMP CIRCUIT ASSEMBLY

BACKGROUND OF THE INVENTION

The present invention relates to rearview mirror lamp circuit assemblies for motor vehicles which are installed in the two rearview mirrors of the motor vehicle and controlled to flash with the directional signals of the motor vehicle or to give off light constantly for illumination during parking.

Nowadays, motor vehicles have become more and more popular. In consequence, the incidents of traffic accidents are increased relatively. A traffic accident will happen if the motor vehicle driver violates the traffic rules or the motor vehicle itself cannot give an apparent indication of its location or directional change. A regular motor vehicle, as shown in FIG. 1, is generally equipped with headlamps 50, front directional signals 51, and rear directional signals 52 for illumination or for giving a signal. However, because the directional signals 51 and 52 are mounted on the front and rear sides of the motor vehicle, they are not apparent when viewed from one lateral side. Therefore, a side impact tends to happen when the direction of the motor vehicle is changing. Because the front directional signals are disposed adjacent to the headlamps, the warning signal from the front directional signals cannot be positively seen when the headlamps are turned on. There are known certain motor vehicles equipped with sidemarker lamps for indication of the position of the motor vehicle. However, these sidemarker lamps are commonly small and not apparent, they cannot provide sufficient light for illumination. The installation locations of these sidemarker lamps vary with the models of the motor vehicles, therefore people cannot accurately judge the actual width of the motor vehicle by means of the light of the sidemarker lamps. Because regular motor vehicles do not have side lamps for illumination while parking in the side of a road at night, the motor vehicle may strike against objects of obstacles nearby. In case one headlamp is damaged, the motor vehicle may be identified incorrectly as a motorcycle during the dark, and therefore a traffic accident tends to happen in this condition. Furthermore, because the headlamps and directional signals are disposed at an elevation much lower than the driver's seat, the motor vehicle driver can only check the operation of the headlamps and the directional signals through the instrument board. However, if the electric circuit of the motor vehicle is out of order, the indicator lamps on the instrument board may be turned on when the headlamps or directional signals do no work. When this condition happens, a traffic accident may occur.

SUMMARY OF THE INVENTION

The present invention has been accomplished under the circumstances in view. It is one object of the present invention to provide a rearview mirror lamp circuit assembly for motor vehicles which shows the location and width of the motor vehicle apparently during the dark. It is another object of the present invention to provide a rearview mirror lamp circuit assembly for motor vehicles which gives off light for illumination when the motor vehicle is parking. It is still another object of the present invention to provide a rearview mirror lamp circuit assembly for motor vehicles which gives a flashing warning signal when the motor vehicle is turned from one direction to another.

To achieve the aforesaid and other objects, there is provided a rearview mirror lamp circuit assembly comprised of a motor vehicle rearview mirror case fastened to one side of the body of a motor vehicle by a mounting support, the motor vehicle rearview mirror case comprising a back lamp hole at a back side thereof, a side lamp hole at an outer lateral side thereof, and a wire hole through the mounting support; a front lamp mounted in the back lamp hole and electrically connected to the headlamps of the motor vehicle for a synchronizing operation; a side lamp mounted in the side lamp hole and electrically connected to the front and rear directional signals of the motor vehicle of the same side; and a control circuit connected to the electric circuit of the motor vehicle for controlling the operation of the front lamp and the side lamp, permitting the side lamp to be intermittently turned on and off with the corresponding directional signals of the motor vehicle, or permitting the side lamp to be constantly turned on without flashing.

DETAILED DESCRIPTION OF THE PREFERRED EMBODIMENT

Figure 1:
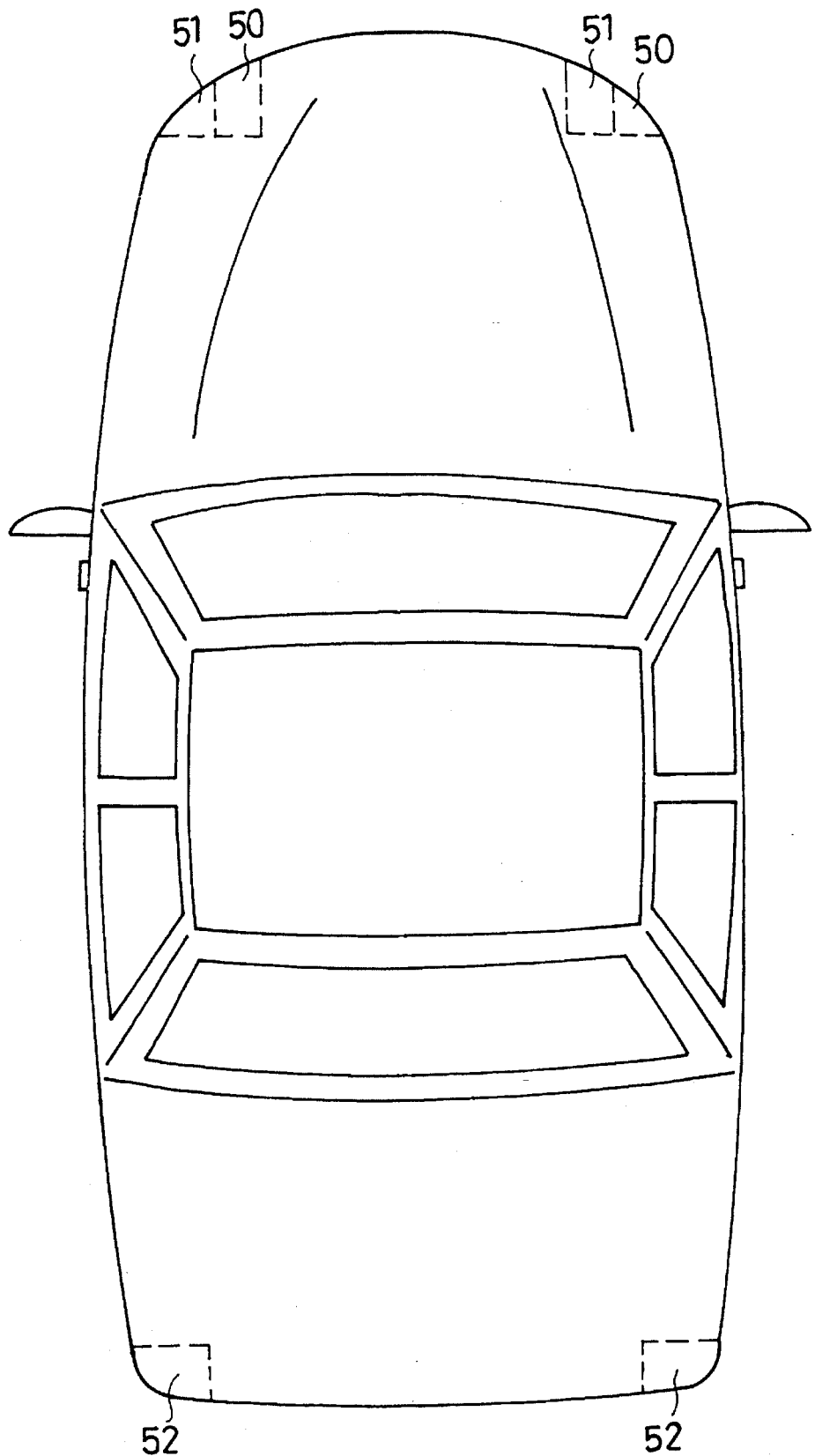
FIG. 1 is a top plain view of a regular motor vehicle showing the installation of the headlamps, the front directional signals, and the rear directional signals.
Figure 2:
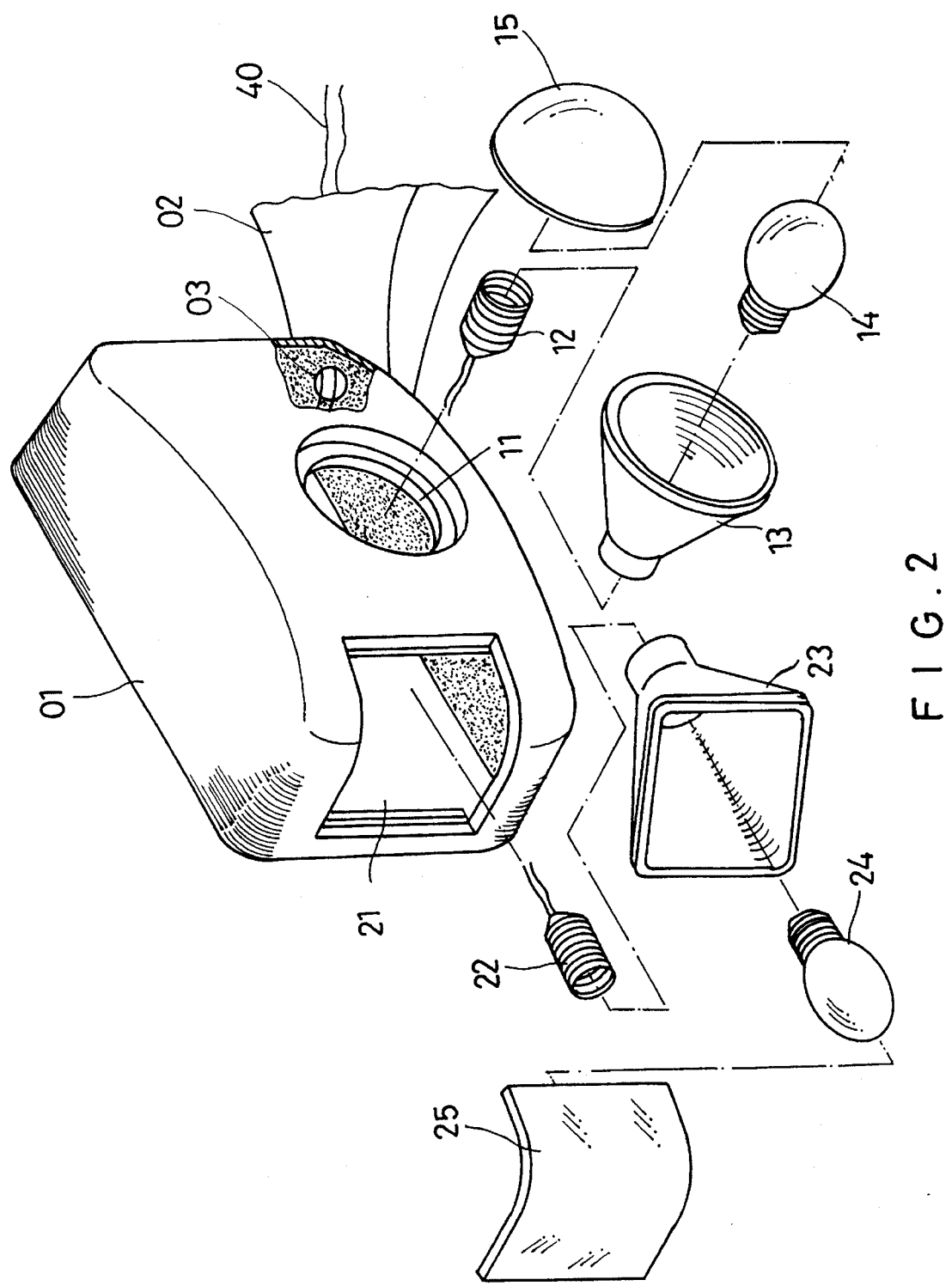
FIG. 2 is an exploded view of a rearview mirror lamp circuit assembly according to the present invention.
Figure 3:
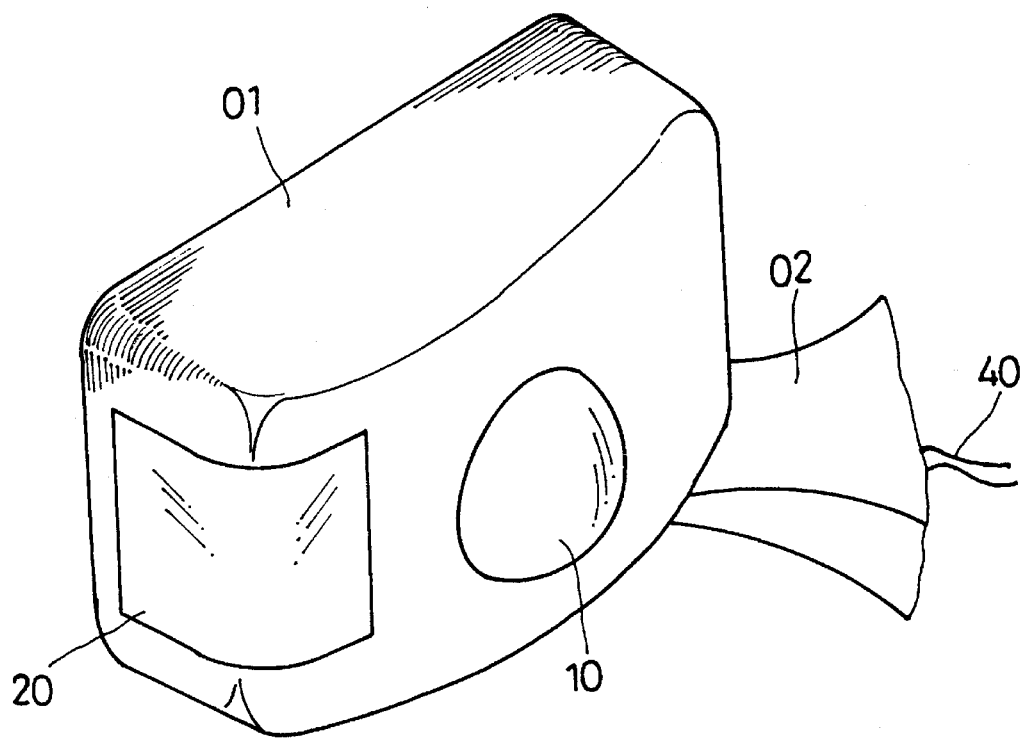
FIG. 3 is an elevational view of the rearview mirror lamp circuit assembly shown in FIG. 2.

Referring to FIGS. 2 and 3, a rearview mirror lamp circuit assembly in accordance with the present invention is generally comprised of a rearview mirror case 01 for a motor vehicle rearview mirror, a front lamp 10, and a side lamp 20. The case 01 has a back lamp hole 11 at the back side thereof, a side lamp hole 21 at an outer lateral side thereof, a wire hole 03 through the mounting support 02 of the rearview mirror. The front lamp 10 and the side lamp 20 are respectively mounted in the back lamp hole 11 and the side lamp hole 21, and the electric wires 40 of the front lamp 10 and the side lamp 20 are inserted through the wire hole 03 and connected to to the control circuit of the motor vehicle. The front lamp 10 is comprised of a reflector 13 mounted inside the case 01 and connected to the back lamp hole 11, a lamp socket 12 mounted within the reflector 13, a lamp bulb 14 fastened to the lamp socket 12, and a lamp cover 15 covered on the back lamp hole 11 and fastened to the reflector 13. Similar to the front lamp 10, the side lamp 20 is comprised of a reflector 23 mounted inside the case 01 and connected to the side lamp hole 21, a lamp socket 22 mounted within the reflector 23, a lamp bulb 24 fastened to the lamp socket 22, and a lamp cover 25 covered on the side lamp hole 21 and fastened to the reflector 23.

Figure 4:
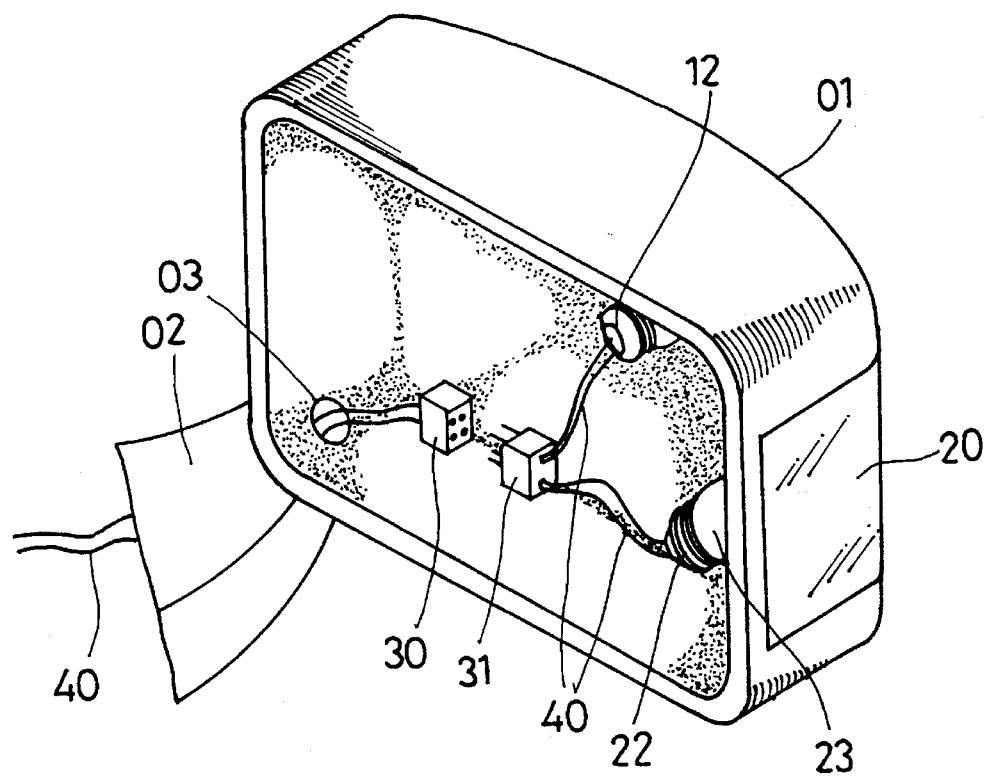
FIG. 4 is a back view of FIG. 3 before the installation of the mirror on the rearview mirror case.

Referring to FIG. 4, the electric wires 40 of the front lamp 10 and the side lamp 20 are respectively connected through a four-male-contact plug 31 and a four-female-contact socket 30, then extended out of the case 01 and the mounting support 02 through the wire hole 03, and then connected to the control circuit of the motor vehicle through a three-step switch.

Figure 5:
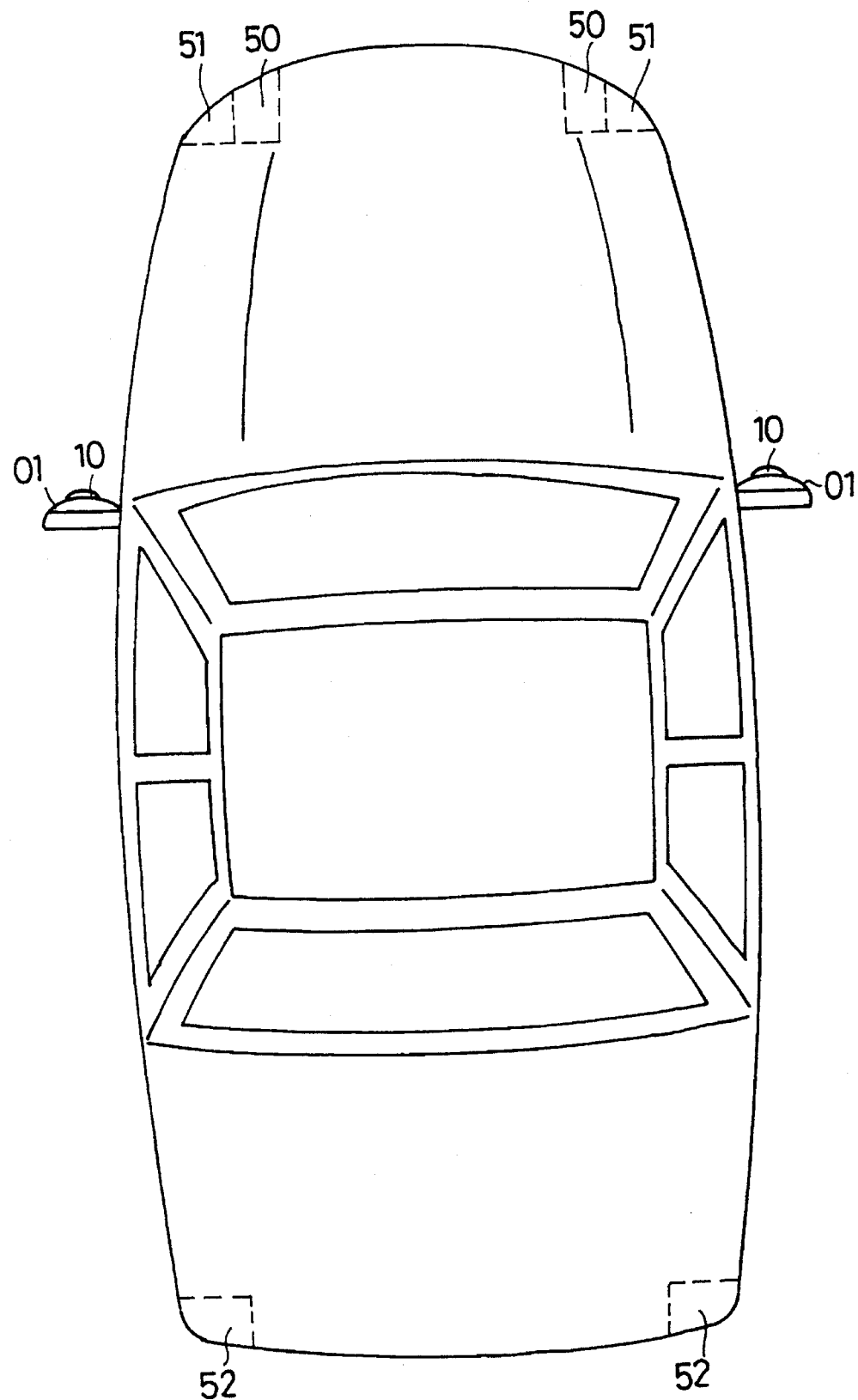
FIG. 5 is a top plain view of a motor vehicle equipped with two rearview mirror lamp circuit assemblies according to the present invention.

FIG. 5 shows a car of which the rearview mirrors are respectively mounted with a lamp circuit assembly according to the present invention. The front lamps 10 and the headlamps 50 are electrically connected together. When the driver turns on the headlamps 50 while driving at night or in the dark, the font lamps 10 of the two lamp circuit assemblies on the two rearview mirrors are simultaneously turned on to give off light and to show the informations of location and width of the present car to the car drivers of the preceding cars. The side lamps 20 of the two lamp circuit assemblies, the front directional signals 51 and the rear directional signals 52 are electrically connected together. When the car turns to the left, the left-sided front directional signal 51, the left-sided rear directional signal 52, and the left-sided side lamp 20 are synchronously driven to flash. When to park the car, the corresponding side lamp 20 can be turned on to illuminate the parking lot. Furthermore, when the aforesaid three-step switch is switched to the first position, the two side lamps 20, the front directional signals 51, and the two rear directional signals 52 are simultaneously and intermittently turned on and off to give a warning signal; when the three-step switch is switched to the second position, the right-side side lamp 20 is turned on without flashing; when the three-step switch is switched to the third position, the left-side side lamp 20 is turned on without flashing.

It is to be understood that the drawings are designed for purposes of illustration only, and are not intended as a definition of the limits and scope of the invention disclosed.

I claim:

1. A rearview mirror lamp circuit assembly comprising:

a motor vehicle rearview mirror case fastened to one side of the body of a motor vehicle by a mounting support, said motor vehicle rearview mirror case comprising a back lamp hole at a back side thereof, a side lamp hole at an outer lateral side thereof, and a wire hole through said mounting support;

a front lamp mounted in said back lamp hole and electrically connected to the headlamps of the motor vehicle for a synchronizing operation;

a side lamp mounted in said side lamp hole and electrically connected to the front and rear directional signals of the motor vehicle of the same side; and a control circuit connected to the electric circuit of the motor vehicle for controlling the operation of said front lamp and said side lamp, permitting said side lamp to be intermittently turned on and off with the corresponding directional signals of the motor vehicle, or permitting said side lamp to be constantly turned on without flashing.

2. The rearview mirror lamp circuit assembly of claim 1 wherein said front lamp is comprised of a reflector mounted inside said rearview mirror case and connected to said back lamp hole, a lamp socket mounted within said reflector, a lamp bulb fastened to said lamp socket, and a lamp cover covered on said back lamp hole and fastened to said reflector.

3. The rearview mirror lamp circuit assembly of claim 1 wherein said side lamp is comprised of a reflector mounted inside said rearview mirror case and connected to said side lamp hole, a lamp socket mounted within said reflector, a lamp bulb fastened to said lamp socket, and a lamp cover covered on said side lamp hole and fastened to said reflector.

* * * * *